US008195256B2

United States Patent
Matsushima et al.

(10) Patent No.: US 8,195,256 B2
(45) Date of Patent: Jun. 5, 2012

(54) INFORMATION TERMINAL DEVICE

(75) Inventors: Manabu Matsushima, Kawasaki (JP);
Yoshifumi Kajiwara, Kawasaki (JP);
Kenta Sugimori, Kawasaki (JP);
Haruyoshi Yada, Kawasaki (JP);
Hiroshi Kubo, Kawasaki (JP);
Kazunobu Yoneyama, Kawasaki (JP);
Katsumi Takada, Kawasaki (JP);
Toshifumi Tanida, Kawasaki (JP);
Susumu Nikawa, Kawasaki (JP); Kinya Inoue, Kawasaki (JP); Masayuki Sato, Kawasaki (JP); Kunihiko Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 152 days.

(21) Appl. No.: 12/722,599

(22) Filed: Mar. 12, 2010

(65) Prior Publication Data
US 2010/0246107 A1 Sep. 30, 2010

(30) Foreign Application Priority Data

Mar. 30, 2009 (JP) .................................. 2009-83762

(51) Int. Cl.
*H04M 1/00* (2006.01)

(52) U.S. Cl. ............... 455/575.4; 455/575.1; 455/575.3; 455/575.8; 455/90.3

(58) Field of Classification Search ............... 455/575.1, 455/575.3, 575.4, 575.8, 90.3
See application file for complete search history.

(56) References Cited

U.S. PATENT DOCUMENTS
2006/0240879 A1* 10/2006 Heikkinen ................. 455/575.1
2008/0096619 A1    4/2008 Kuga et al.

FOREIGN PATENT DOCUMENTS
JP    2008-103989 A    5/2008

* cited by examiner

*Primary Examiner* — Temica M Beamer
(74) *Attorney, Agent, or Firm* — Westerman, Hattori, Daniels & Adrian, LLP

(57) ABSTRACT

An information terminal device includes a first case; a second case electrically connected to the first case with a cable, the second case being movable relative to the first case; and a cable-containing section that allows movement of an extra-length portion of the cable, the extra-length portion being disposed so as to have a spiral shape, the movement of the extra-length portion being caused by movement of one of the first case and the second case, wherein the cable-containing section is disposed in one of the first case and the second case.

12 Claims, 15 Drawing Sheets

< CLOSED STATE >

< OPEN STATE >

< ROTATED STATE >

INFORMATION TERMINAL DEVICE

CROSS-REFERENCE TO RELATED APPLICATIONS

This application is based upon and claims the benefit of priority of the prior Japanese Patent Application No. 2009-083762, filed on Mar. 30, 2009, the entire contents of which are incorporated herein by reference.

FIELD

The present invention relates to an information terminal device. The present invention relates to, for example, an information terminal device in which stowability of an electric wiring line connecting two cases of the information terminal device to each other is improved and breakage of the electric wiring line is reduced if not prevented.

BACKGROUND

Some mobile phones and information terminal devices in widespread use today include a fixed-side case having an operation section such as keys and a movable-side case having a display section such as a display panel. The movable-side case is connected to the fixed-side case with a connection mechanism, so that the movable-side case can be rotated and slid relative to the fixed-side case. In a slide-type mobile phone, the movable-side case can be slid relative to the fixed-side case between a closed state and an open state, so that, for example, the mobile phone is made compact. In a rotation-type mobile phone, the movable-side case can be rotated relative to the fixed-side case so that, for example, the viewability of the display section is improved.

In existing information terminal devices, the fixed-side case and the movable-side case are made as separate bodies, and a circuit board disposed in the fixed-side case and a circuit board disposed in the movable-side case are electrically connected to each other. For the electrical connection, an electric wiring line having a comparatively high flexibility, such as a flexible printed circuit (FPC), is usually used.

[Patent Document 1] Japanese Laid-Open Patent Publication No. 2008-103989

However, the existing information terminal devices have a problem in that the electric wiring line, such as an FPC, has a low stowability. That is, in the information terminal devices, the FPC has a bent portion that is bent in accordance with the amount of relative movement of the movable-side case and the fixed-side case, so that the movable-side case can be movably connected to the fixed-side case. In order to provide the FPC having a strip shape with the bent portion, the FPC is bent in the thickness direction and then laminated. Therefore, the laminated FPC occupies a large space in the thickness direction, which makes it difficult to make a low-profile device.

If the FPC is forcedly bent in a small space, the FPC may be curved, buckled, or twisted owing to a load that is generated due to repeated movement of the movable-side case, which may lead to breakage of the FPC. If the information terminal device is a rotation-type mobile phone and a strip-shaped FPC is used as the electric wiring line, it is very likely that a breakage may occur because the FPC has an extremely low durability against twisting.

SUMMARY

According to an aspect of the invention, an information terminal device includes a first case; a second case electrically connected to the first case with a cable, the second case being movable relative to the first case; and a cable-containing section that allows movement of an extra-length portion of the cable, the extra-length portion being disposed so as to have a spiral shape, the movement of the extra-length portion being caused by movement of one of the first case and the second case, wherein the cable-containing section is disposed in one of the first case and the second case.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

An embodiment of the information terminal device disclosed in the present application will be described in detail with reference to the drawings. In the embodiment, the information terminal device disclosed in the present application is applied to a rotatable-type mobile phone. The information terminal device disclosed in the present application may be broadly applied to various types of information terminal devices such as a slide-type mobile phone.

Figure 1:
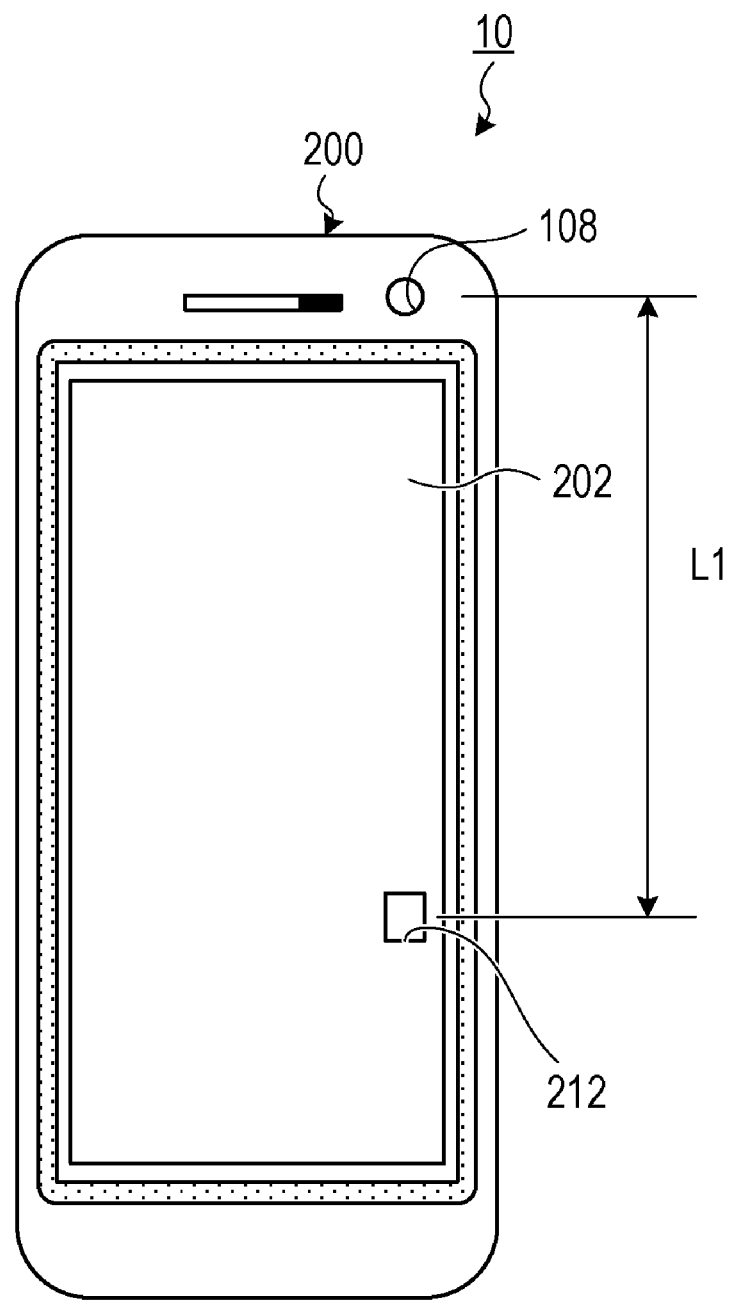
FIG. 1 is a plan view of a mobile phone according to an embodiment in a closed state.
Figure 2:
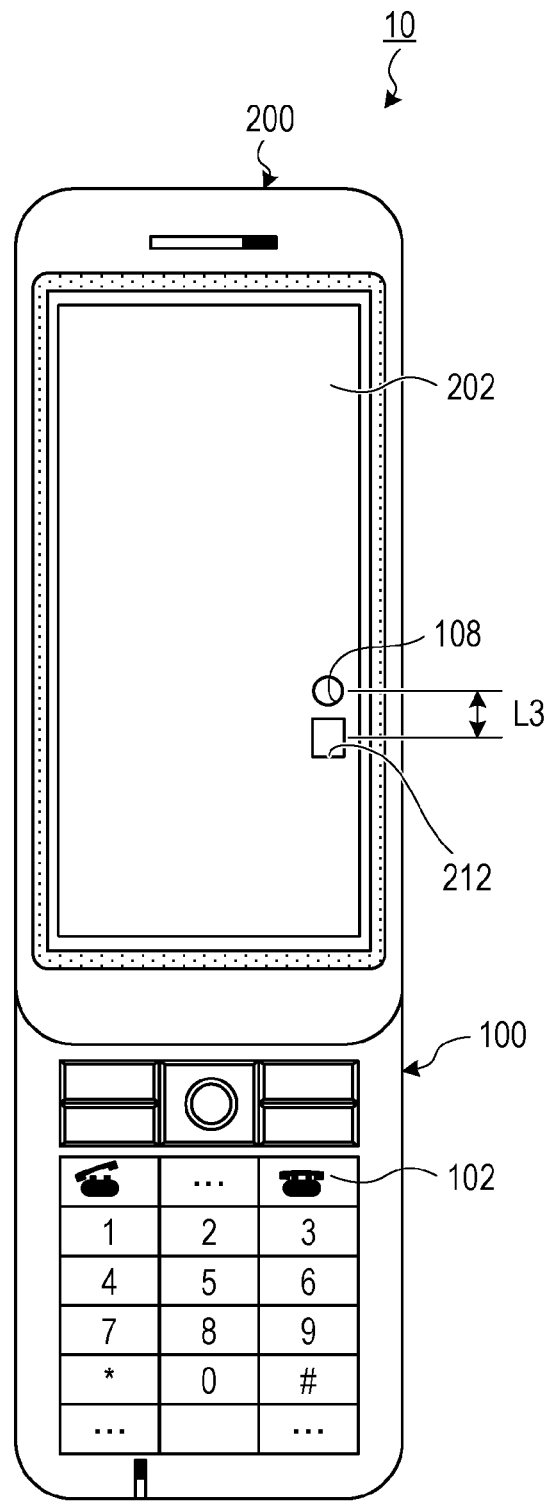
FIG. 2 is a plan view of the mobile phone according to the embodiment in an open state.
Figure 3:
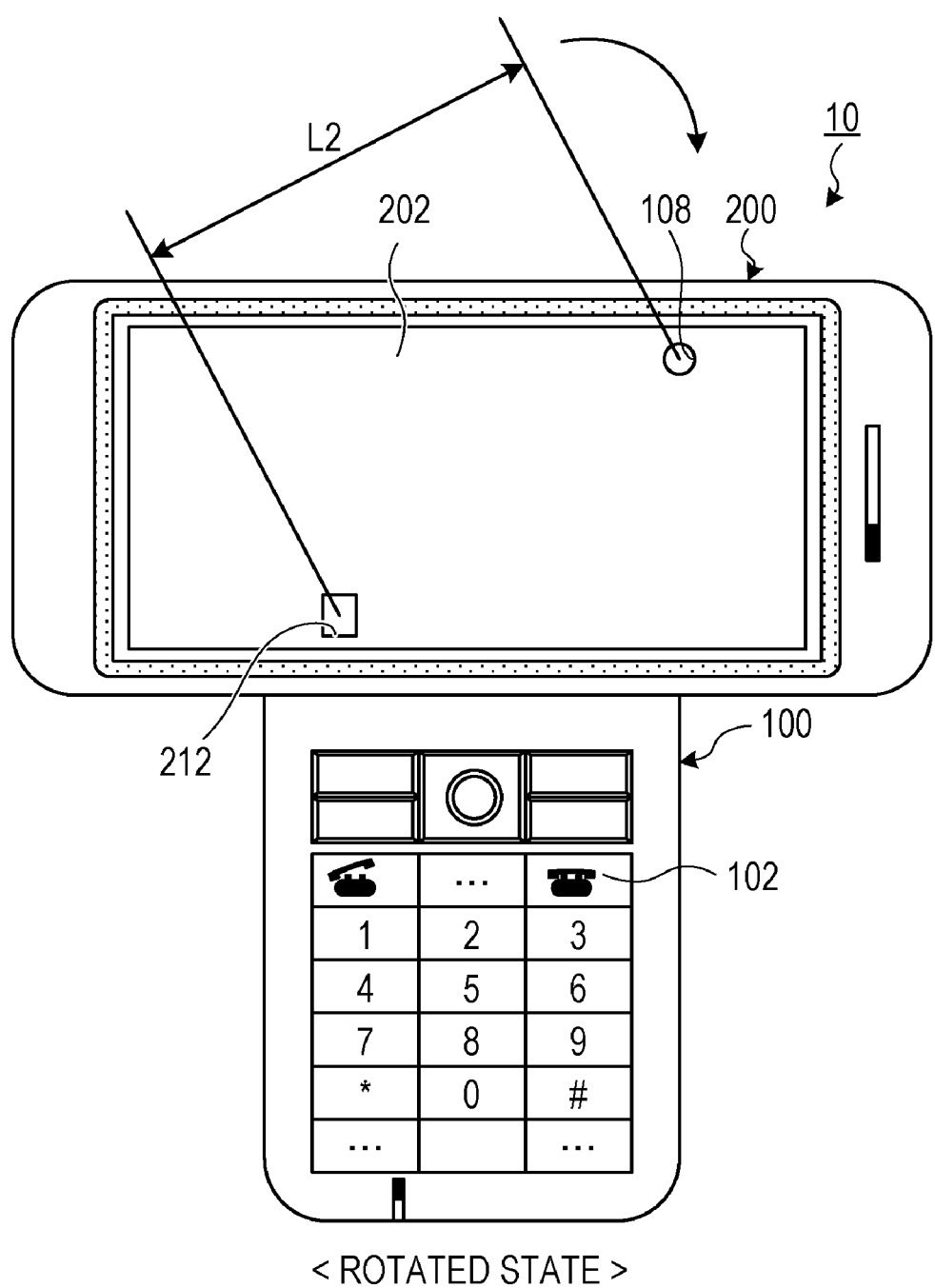
FIG. 3 is a plan view of the mobile phone according to the embodiment in a rotated state.

The structure of a mobile phone 10 according to the embodiment will be described. FIG. 1 is a plan view of the mobile phone 10 according to an embodiment in a closed state. FIG. 2 is a plan view of the mobile phone 10 according to the embodiment in an open state. FIG. 3 is a plan view of the mobile phone 10 according to the embodiment in a rotated state.

As illustrated in FIGS. 1 to 3, the mobile phone 10 includes a fixed-side case 100 that corresponds to a first case, and a movable-side case 200 that corresponds to a second case. The movable-side case 200 is connected to the fixed-side case 100 with a connection mechanism (not illustrated) so that the movable-side case 200 may be moved relative to the fixed-side case 100. Operation buttons 102, which corresponds to an operation section, are disposed on the fixed-side case 100. The operation buttons 102 include a plurality of keys such as character keys and cursor keys. A display panel 202, which corresponds to a display section, is disposed on the movable-side case 200. The display panel 202 includes, for example, a liquid crystal display (LCD) device. The connection mechanism is disposed between the fixed-side case 100 and the movable-side case 200. The connection mechanism includes movement mechanisms, such as a slide mechanism that slidably connects the movable-side case 200 to the fixed-side case 100 and a rotation mechanism that rotatably connects the movable-side case 200 to the fixed-side case 100.

The state of the mobile phone 10 may be changed between a closed state illustrated in FIG. 1, an open state illustrated in FIG. 2, and a rotated state illustrated in FIG. 3 by sliding and rotating the movable-side case 200 relative to the fixed-side case 100 with the slide mechanism.

The closed state illustrated in FIG. 1 is a state in which the movable-side case 200 and the fixed-side case 100 almost completely overlap each other. In the closed state, the length of the mobile phone 10 in the longitudinal direction is the shortest. Therefore, the mobile phone 10 may be set to be in the closed state when a user carries the mobile phone 10 or browses simple information, such as, for example, the call register or information on the Internet.

The open state illustrated in FIG. 2 is a state in which the movable-side case 200 and the fixed-side case 100 overlap each other in an area smaller than that in the closed state. In the open state, the length of the mobile phone 10 in the longitudinal direction is longer than that in the closed state. In the open state, the operation buttons 102 on the fixed-side case 100 are exposed. Therefore, the mobile phone 10 may be set to be in the open state when a user makes a phone call or writes an email message using the operation buttons 102.

The rotated state illustrated in FIG. 3 is a state in which the movable-side case 200 has been rotated relative to the fixed-side case 100 by approximately 90° compared with the open state illustrated in FIG. 2. In the rotated state, the display panel 202 is in a landscape position. Therefore, the mobile phone may be set to be in the rotated state when a user watches TV, browses information on the Internet, reads a received email message, or plays a game.

Figure 4:
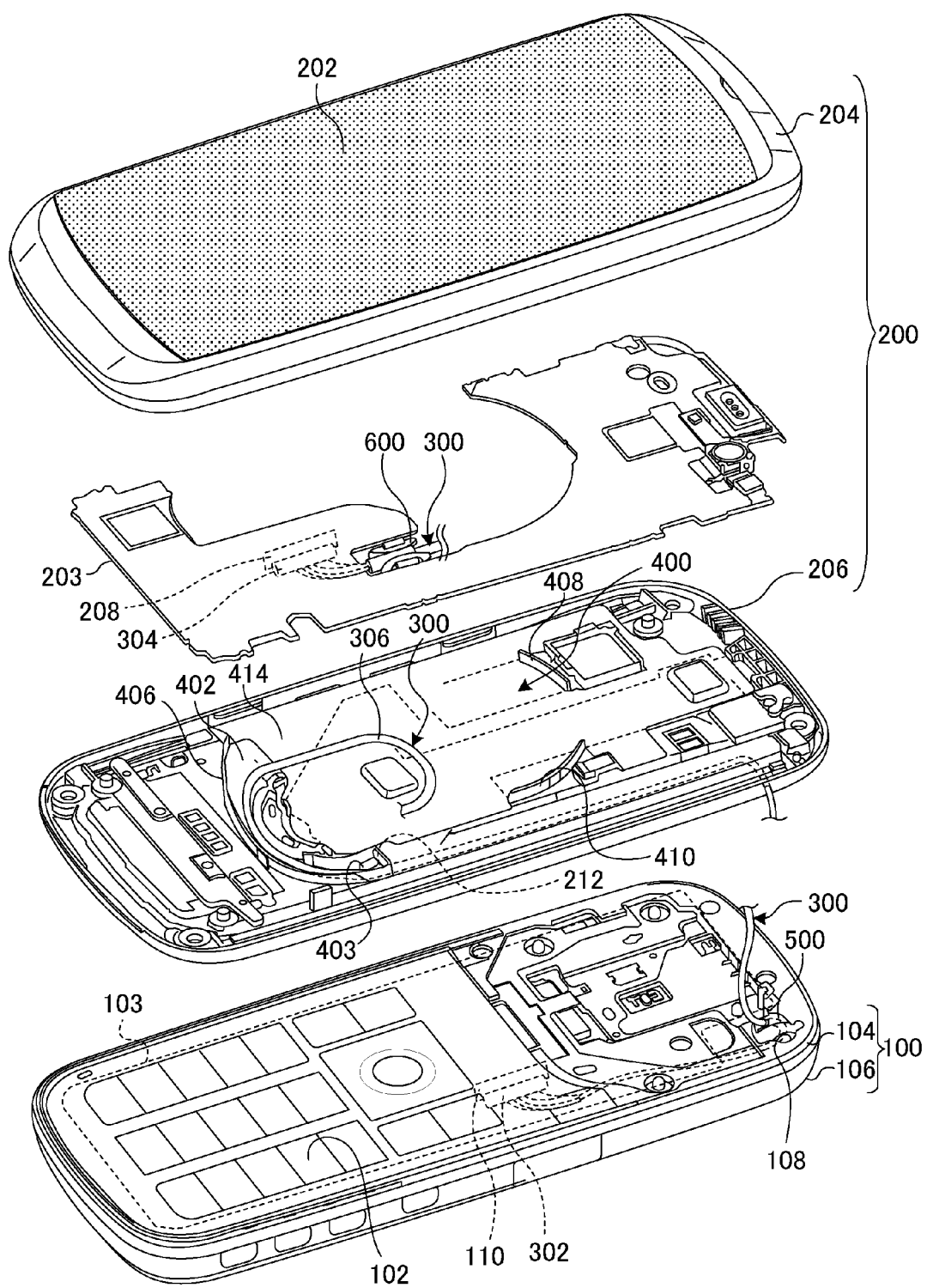
FIG. 4 is an exploded perspective view of the mobile phone in the closed state viewed from a movable-side case side.
Figure 5:
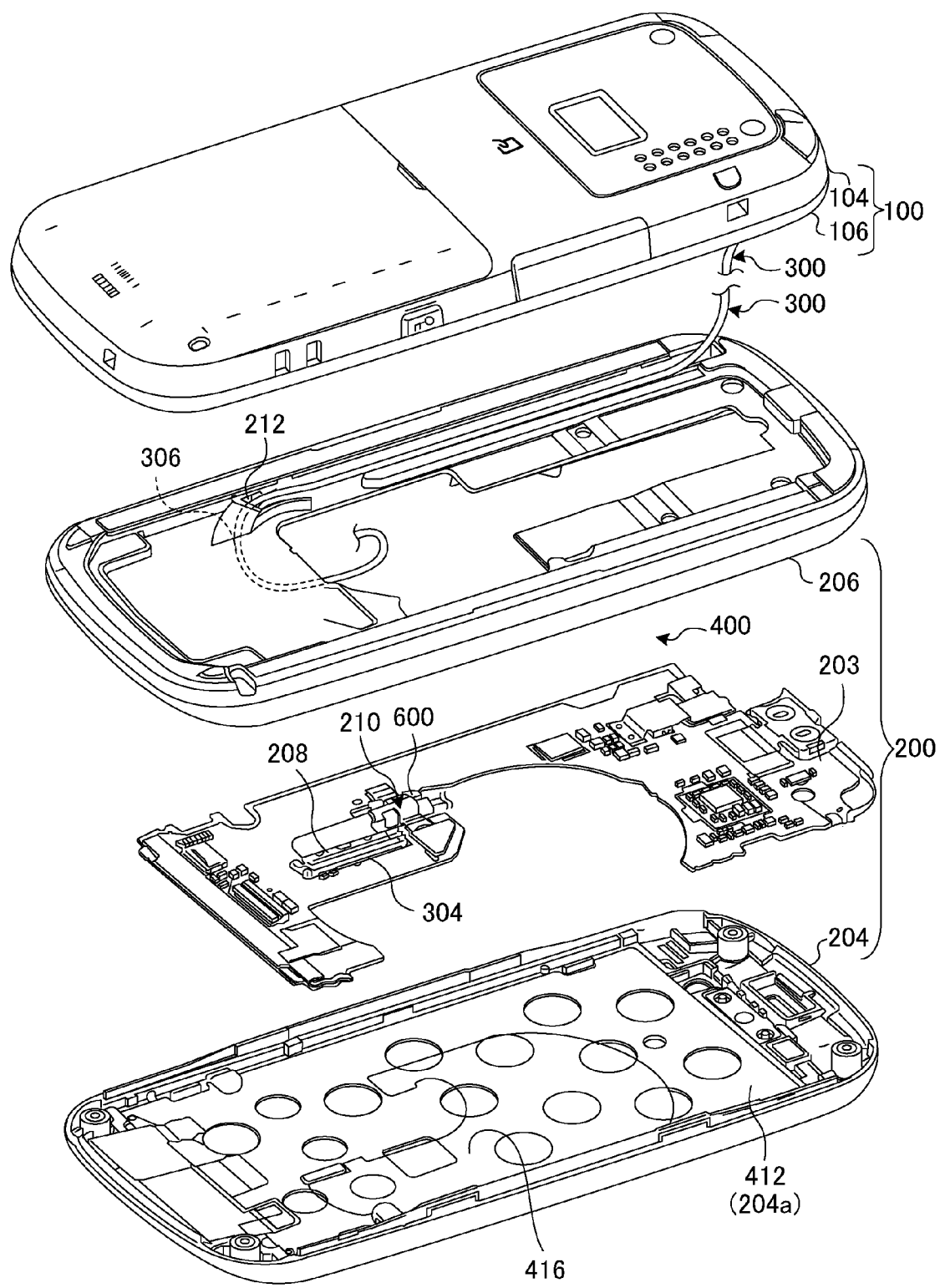
FIG. 5 is an exploded perspective view of the mobile phone in the closed state viewed from a fixed-side case side.

Referring to FIGS. 4 and 5, the internal structure of the mobile phone 10 and the wiring structure in the mobile phone 10 will be described. FIG. 4 is an exploded perspective view of the mobile phone 10 in the closed state viewed from the movable-side case 200 side. FIG. 5 is an exploded perspective view of the mobile phone 10 in the closed state viewed from the fixed-side case 100 side. In FIGS. 4 and 5, components that are the same as those in FIGS. 1 and 3 are denoted by the same numerals.

As illustrated in FIGS. 4 and 5, in the mobile phone 10 according to the embodiment, a cable 300 extends between the fixed-side case 100 and the movable-side case 200. In the embodiment, a fixed-side substrate 103 is disposed in the fixed-side case 100 and a movable-side substrate 203 is disposed in the movable-side case 200. The cable 300 electrically connects the fixed-side substrate 103 and the movable-side substrate 203 to each other. When the movable-side case 200 is moved relative to the fixed-side case 100, a load is applied to the cable 300. The types of movement of the movable-side case 200 relative to the fixed-side case 100 include, for example, sliding and rotation.

The fixed-side case 100 includes a fixed-side front case 104 and a fixed-side rear case 106. Keys of the operation buttons 102 are disposed on a surface of the fixed-side front case 104 facing the movable-side case 200. A through hole 108 for inserting the cable 300 therethrough is formed in the surface at an edge portion away from the operation buttons 102. The through hole 108, for example, corresponds to a second through hole. A fixed-side confining member 500 (described below) is attached to the through hole 108. The fixed-side confining member 500 corresponds to a first confining member. The fixed-side confining member 500 allows the cable 300 to be inserted from the inside to the outside of the fixed-side case 100, and fixes the cable 300 to the fixed-side case 100.

The fixed-side substrate 103 is mounted on the fixed-side rear case 106. A connection adapter 110 is formed on the fixed-side substrate 103. The connection adapter 110 is connected to a connector 302 that is attached to a first end of the cable 300. The connection adapter 110 is disposed near the through hole 108 so that the length of the cable 300 may be shortened.

The movable-side case 200 includes a movable-side front case 204 and a movable-side rear case 206. The display panel 202 and the movable-side substrate 203 are mounted on the movable-side front case 204. A connection adapter 208 is formed on the movable-side substrate 203. The connection adapter 208 is connected to a connector 304 attached to a second end of the cable 300. The connection adapter 208 is disposed near a through hole 212 (described below) so that the length of the cable 300 may be shortened. A movable-side confining member 600 (described below) is attached to a position near the connection adapter 208 with a clip 210. The cable 300 is held by the movable-side confining member 600 and thereby fixed to the movable-side substrate 203. The movable-side confining member 600 corresponds to a second confining member.

A display panel holder 204a for holding the display panel 202 is disposed on a surface of the movable-side front case 204 facing the movable-side rear case 206, which is the back surface of the movable-side front case 204. The display panel holder 204a, which has a flat-plate shape, is joined to the movable-side front case 204. Regarding the embodiment, the back surface of the movable-side front case 204 and the display panel holder 204a may be collectively referred to as "the back surface of the movable-side front case 204".

The through hole 212 for inserting the cable 300 therethrough is formed in a surface of the movable-side rear case 206 facing the fixed-side case 100. The through hole 212 corresponds to a first through hole.

A cable-containing section 400 is disposed in an inner space of the movable-side case 200 between the front surface of the movable-side rear case 206 and the back surface of the movable-side front case 204. The front surface of the movable-side rear case 206 is a surface of the movable-side rear case 206 facing the movable-side front case 204. The cable-containing section 400 serves as a path that guides the first end of the cable 300, the second end of which is connected to the movable-side substrate 203 disposed in the movable-side case 200, toward the fixed-side case 100, and provides a space for containing a middle portion of the cable 300. The cable-containing section 400 has a structure that allows movement of the cable 300 when the movable-side case 200 is moved. The specific structure of the cable-containing section 400 will be described below in detail.

The cable 300 is a signal line including a bundle of thin coaxial cables. The connector 302 is attached to the first end of the cable 300, and the connector 304 is attached to the second end of the cable 300. The cable 300 has an extra-length portion 306 in the middle thereof. The extra-length portion 306 of the cable 300 has a length that allows for connection of the connection adapter 110 of the fixed-side substrate 103 to the connection adapter 208 of the movable-side substrate 203. The extra-length portion 306 of the cable 300 provides the cable 300 with an extra length that is desired for assembling the mobile phone 10 and a length desired for dispersing stress due to movement of the movable-side case 200. When the movable-side case 200 is moved relative to the fixed-side case 100, the extra-length portion 306 of the cable 300 moves in the cable-containing section 400.

The extra-length portion 306 of the cable 300 is covered with a protective coating made of fiber or tape having a low coefficient of friction. The protective coating reinforces the extra-length portion 306, and reduces if not prevents buckling of the extra-length portion 306 that moves in the cable-containing section 400. The protective coating reduces the frictional resistance between the extra-length portion 306 and the cable-containing section 400, so that damage to the extra-length portion 306 is suppressed.

There exist a region of the fixed-side case 100 and a region of the movable-side case 200 that overlap each other irrespective of whether the mobile phone 10 is in the closed state, the open state, or the rotated state. The through hole 108 and the through hole 212 are disposed in the overlapping regions. The cable 300 is inserted through the through hole 108 and the through hole 212 so as to electrically connect the fixed-side substrate 103 and the movable-side substrate 203 to each other. With this structure, electrical signals may be exchanged between electric components mounted on the fixed-side substrate 103 and electric components mounted on the movable-side substrate 203 through the cable 300, and electric power is supplied to the electric components through the cable 300.

Figure 6:
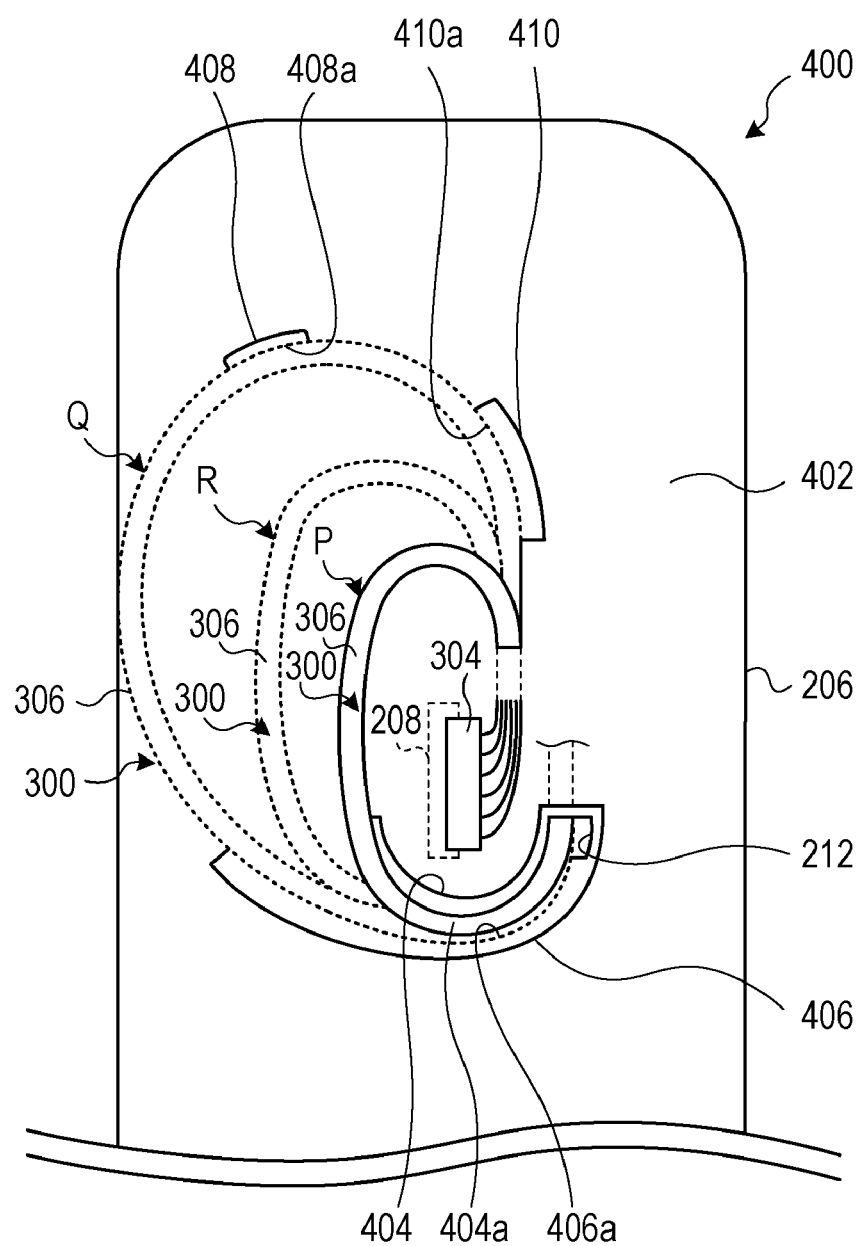
FIG. 6 is a plan view of a cable-containing section.

Referring to FIG. 6, the structure of the cable-containing section 400 will be described. FIG. 6 is a plan view of the cable-containing section 400. In FIG. 6, components the same as those in FIGS. 4 and 5 are denoted by the same numerals.

As described above, the cable-containing section 400 is disposed in an inner space of the movable-side case 200 between the front surface of the movable-side rear case 206 and the back surface of the movable-side front case 204. The cable-containing section 400 includes a bottom wall 402 formed on the front surface of the movable-side rear case 206; upright walls 404, 406, 408, and 410 standing upright on the bottom wall 402; and a top wall 412 formed on the back surface of the movable-side front case 204. The cable-containing section 400 makes the extra-length portion 306 of the cable 300 take a spiral shape, contains the extra-length portion 306, and allows movement of the extra-length portion 306 when the movable-side case 200 is moved.

The cable 300, which is inserted through the through hole 212 from the fixed-side substrate 103 side toward the movable-side substrate 203 side, is placed on the bottom wall 402. The bottom wall 402 includes a guiding section 403 that guides the cable 300 through the through hole 212 toward the movable-side substrate 203. The guiding section 403 has an inclined surface. Thus, the cable 300 may be routed through the through hole 212 and smoothly guided over the upper surface of the bottom wall 402 along the guiding section 403 without the cable 300 being excessively bent.

The upright walls 404, 406, 408, and 410 stand on the bottom wall 402 and confine the extra-length portion 306 of the cable 300 placed on the bottom wall 402, and thereby make the extra-length portion 306 take a spiral shape on the bottom wall 402. The upright walls 404, 406, 408, and 410 respectively include curved surfaces 404a, 406a, 408a, and 410a each having a specific curvature. The extra-length portion 306 is disposed along the curved surfaces 404a, 406a, 408a, and 410a, whereby the extra-length portion 306 is confined.

Among the upright walls 404, 406, 408, and 410, the upright walls 404 and 406 are disposed around the through hole 212 in such a manner that the curved surfaces 404a and 406a face each other. The upright walls 404 and 406 confine the extra-length portion 306 of the cable 300 inserted through the through hole 212 and bend the extra-length portion 306 so that the extra-length portion has an arc shape. The upright wall 406 is disposed closer to the outer periphery of the movable-side rear case 206 than the upright wall 404. The curved surface 406a of the upright wall 406 has a plurality of curvatures that are different from each other. The extra-length portion 306 is disposed along the curved surface 406a so that the extra-length portion 306 is gradually confined. Because the extra-length portion 306 of the cable 300 is bent gradually, extremely sharp bending of the extra-length portion 306 is reduced if not prevented.

The curvature of the upright walls 404 and 406 progressively decreases with increasing distance from the through hole 212, so that the extra-length portion 306 of the cable 300 is able to move in the width direction.

The upright walls 408 and 410 are disposed at positions farther from the through hole 212 than the upright walls 404 and 406. The upright walls 408 and 410 further confine the cable 300 that is confined by the upright walls 404 and 406 and make the cable 300 take an arc shape, and guide the cable 300 toward the connection adapter 208 of the movable-side case 200.

The top wall 412 and the bottom wall 402 confine the cable 300 with the upright walls 404, 406, 408, and 410 therebetween. That is, the top wall 412 and the upright wall 404 cooperatively confine the cable 300 on the bottom wall 402, so that the cable 300 does not leave the cable-containing section 400 and the cable 300 is not buckled or twisted.

Protective sheets 414 and 416 having low coefficients of friction are respectively applied to the bottom wall 402 and the top wall 412, so that frictional resistance against the cable 300 is reduced and the cable 300 may smoothly slide along the bottom wall 402 and the top wall 412.

The relationship between the states of the mobile phone 10 and the function of the upright walls 404, 406, 408, and 410 of the cable-containing section 400 will be described.

The state of the mobile phone 10 may be changed between the closed state illustrated in FIG. 1, the open state illustrated in FIG. 2, and the rotated state illustrated in FIG. 3 by moving the movable-side case 200 relative to the fixed-side case 100. In the mobile phone 10, the positional relationship between the through hole 108, which is formed in the fixed-side front case 104 of the fixed-side case 100, and the through hole 212, which is formed in the movable-side rear case 206 of the movable-side case 200, changes in accordance with the states illustrated in FIGS. 1 to 3. That is, the distance between the through hole 108 in the fixed-side case 100 and the through hole 212 in the movable-side case 200 is distance L1 in the closed state, which is the largest, distance L3 in the open state, which is the smallest, and distance L2 in the rotated state, which is larger than distance L3 and smaller than distance L1.

When the movable-side case 200 is moved and the state of the mobile phone 10 is changed, the extra-length portion 306 of the cable 300 moves in the cable-containing section 400, and the upright walls 404, 406, 408, and 410 of the cable-containing section 400 make the extra-length portion 306 take a spiral shape. When the mobile phone 10 is in the closed state illustrated in FIG. 1, the distance between the through hole 108 in the fixed-side case 100 and the through hole 212 in the movable-side case 200 is distance L1, which is the largest. Therefore, the extra-length portion 306 of the cable 300 is pulled out of the cable-containing section 400 through the through hole 212. In the closed state, as indicated by a symbol P in FIG. 6, the upright wall 404, which is disposed more inward than the upright wall 406 on the movable-side rear case 206, confines the extra-length portion 306 along the curved surface 404a, and thereby makes the extra-length portion 306 take a spiral shape having the smallest length in the longitudinal direction.

When the mobile phone 10 is in the open state illustrated in FIG. 2, the distance between the through hole 108 in the fixed-side case 100 and the through hole 212 in the movable-side case 200 is distance L3, which is the smallest. Therefore, the extra-length portion 306 of the cable 300 is pushed into the cable-containing section 400 through the through hole 212. In the open state, as indicated by a symbol Q in FIG. 6, the upright walls 406, 408, and 410, which are disposed more outward than the upright wall 404 on the movable-side rear case 206, confine the extra-length portion 306 along the curved surfaces 406a, 408a, and 410a, and thereby make the extra-length portion 306 take a spiral shape having the largest length in the longitudinal direction.

When the mobile phone 10 is in the rotated state illustrated in FIG. 3, the distance between the through hole 108 in the fixed-side case 100 and the through hole 212 in the movable-side case 200 is distance L2, which is larger than distance L3 and smaller than distance L1. In the rotated state, as indicated by a symbol R in FIG. 6, the upright walls 404 and 406, which are disposed around the through hole 212, confine the extra-length portion 306 along the curved surfaces 404a and 406a, and thereby make the extra-length portion 306 take a spiral shape having a length in the longitudinal direction larger than the length of the shape indicated the symbol P and smaller than the length of the shape indicated by the symbol Q in FIG. 6.

In the embodiment, the cable-containing section 400 makes the extra-length portion 306 of the cable 300 take a spiral shape, contains the extra-length portion 306, and allows movement of the extra-length portion 306 when the movable-side case 200 is moved. Therefore, excessive bending, buckling, and twisting of the extra-length portion 306 are reduced if not prevented, and a load applied to the extra-length portion 306 when the movable-side case 200 is moved is dispersed.

Figure 7:
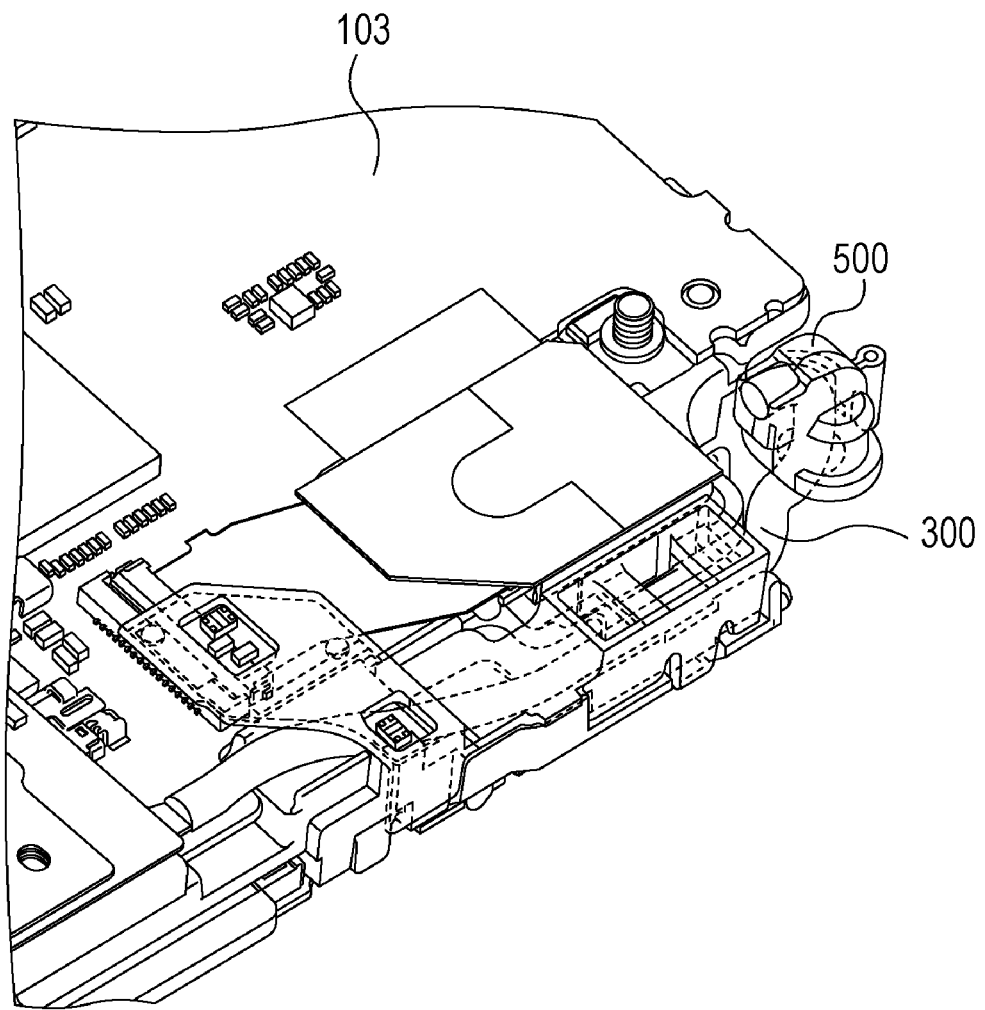
FIG. 7 is an internal perspective view of fixed-side case of a vicinity of a fixed-side confining member.
Figure 8:
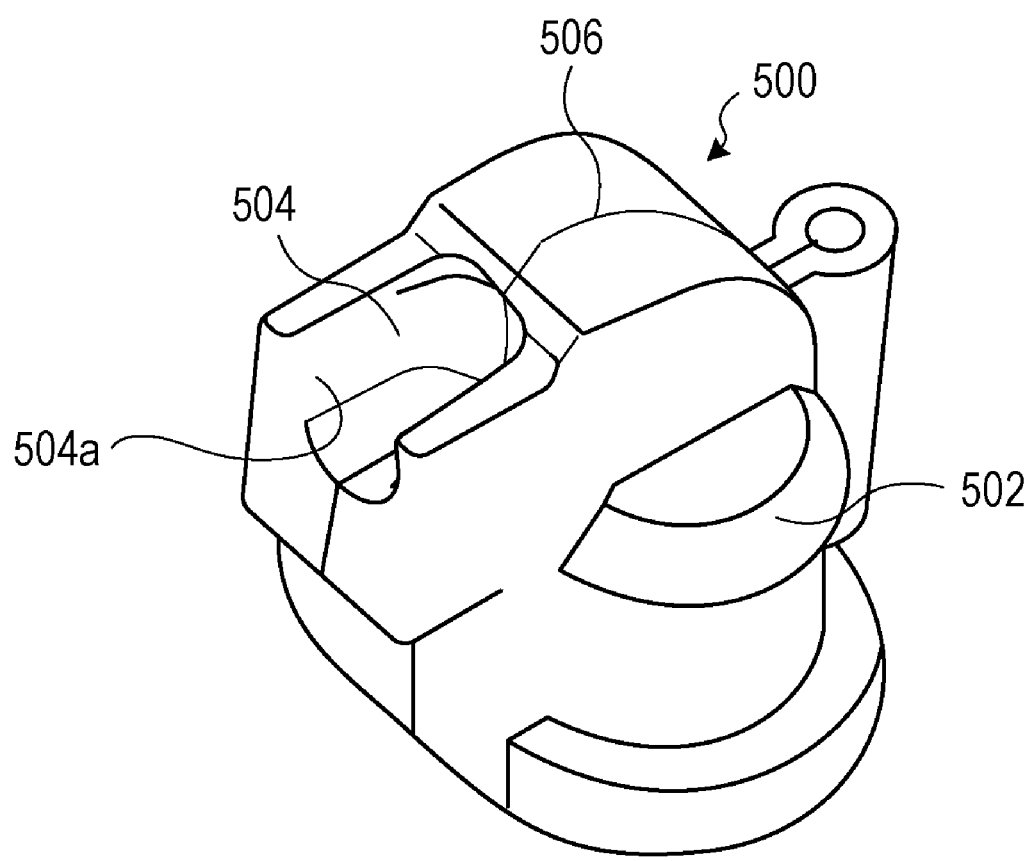
FIG. 8 is an enlarged top perspective view of the fixed-side confining member.
Figure 9:
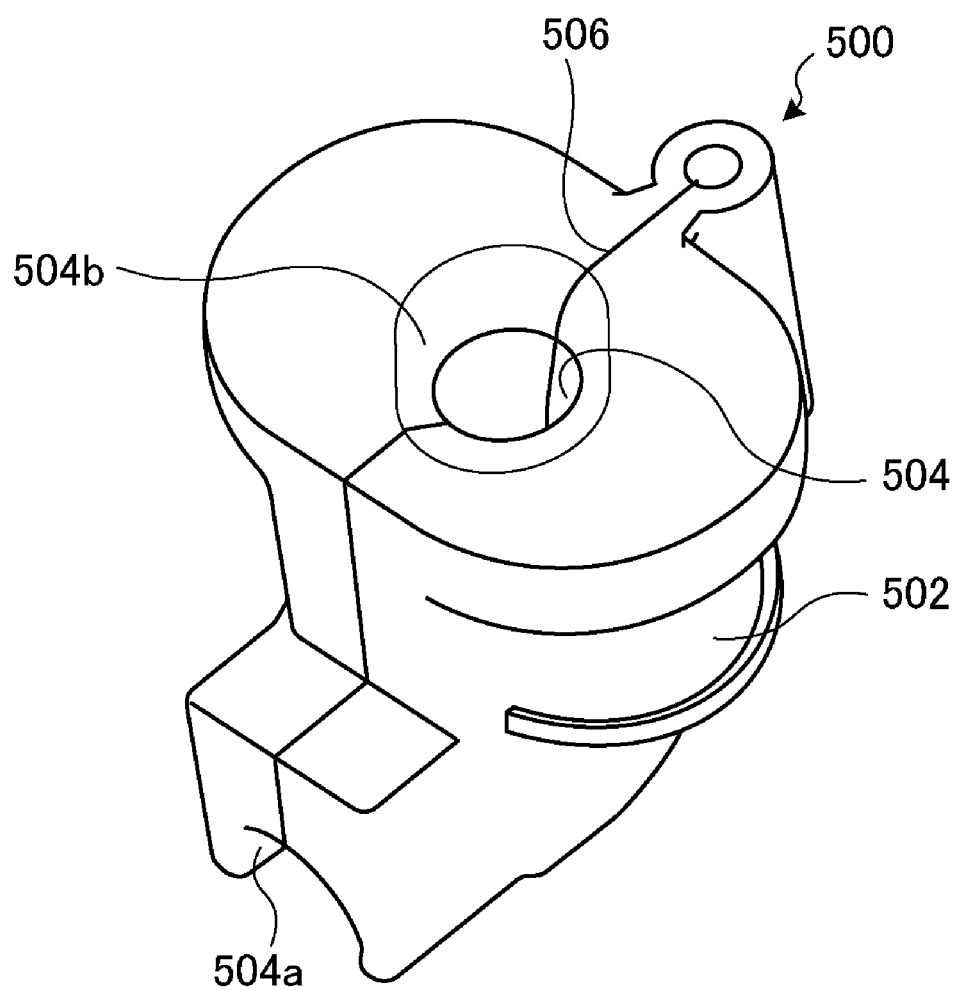
FIG. 9 is an enlarged bottom perspective view of the fixed-side confining member.
Figure 10:
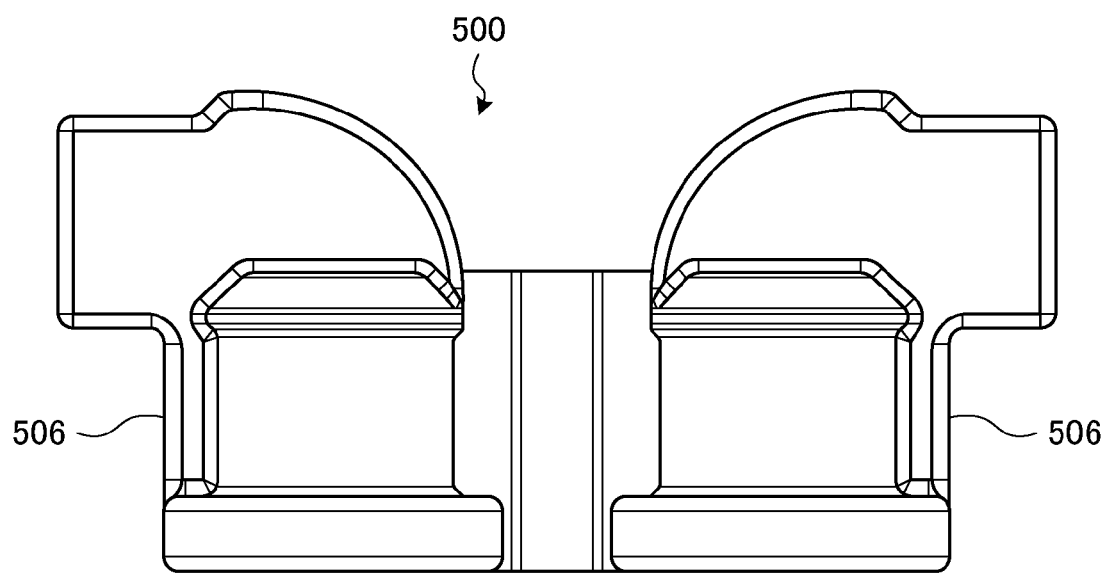
FIG. 10 is a developed view of the fixed-side confining member.

Referring to FIGS. 7 to 10, the structure of the fixed-side confining member 500 attached to the through hole 108 in the fixed-side case 100 will be described in detail. FIG. 7 is an internal perspective view of fixed-side case 100 of a vicinity of the fixed-side confining member 500. FIG. 8 is an enlarged top perspective view of the fixed-side confining member 500. FIG. 9 is an enlarged bottom perspective view of the fixed-side confining member 500. FIG. 10 is a developed view of the fixed-side confining member 500.

As illustrated in FIGS. 4 and 7, the fixed-side confining member 500 is attached to the through hole 108 in the fixed-side case 100. The fixed-side confining member 500 guides the cable 300, which extends through the through hole 212 in the movable-side case 200, toward the fixed-side substrate 103, and confines movement of the guided cable 300 in the longitudinal direction.

As illustrated in FIGS. 8 and 9, the fixed-side confining member 500 includes a fixed-side confining member body 502 and a cable guiding path 504 formed in the fixed-side confining member body 502. The fixed-side confining member body 502, which is made of an elastic material, is fitted into the through hole 108 in the fixed-side case 100. The cable guiding path 504 guides the cable 300, which extends through the through hole 212 in the movable-side case 200, toward the fixed-side substrate 103, and presses the inner peripheral surface of the cable guiding path 504 to the outer peripheral surface of the cable 300 so as to confine movement of the cable 300 in the longitudinal direction.

In the embodiment, the fixed-side confining member 500 is attached to the through hole 108 in the fixed-side case 100, and the fixed-side confining member 500 confines movement of the cable 300 that is guided toward the fixed-side substrate 103, in the longitudinal direction. Thus, if tension is applied to the cable 300 during assembling or when the movable-side case 200 is moved, application of an excessive load to the first end of the cable 300, which is connected to the connection adapter 110 of the fixed-side substrate 103 through the connector 302, may be avoided. Therefore, troubles such as breakage of the cable 300 and disconnection of the connector 302 may be reduced if not prevented.

Movement of the cable 300 in the longitudinal direction is confined in the fixed-side case 100, so that an inadvertent change in the length of the extra-length portion 306 of the cable 300 may be avoided. Thus, for example, the length of the extra-length portion 306 becoming excessively long and the extra-length portion 306 being caught on a portion of the cable-containing section 400 may be avoided.

The cable guiding path 504 is formed in the fixed-side confining member 500 made of the an elastic material, and movement of the cable 300 in the longitudinal direction is confined by pressing the inner peripheral surface of cable guiding path 504 against the outer peripheral surface of the cable 300. Therefore, application of an excessive force on the confined portion of the cable 300 may be avoided.

Wider portions 504a and 504b are respectively formed at the entrance and the exit of the cable guiding path 504 so as to allow the cable 300 to move in the width direction. Thus, the cable 300 may move in the width direction when the movable-side case 200 is moved, whereby twisting or the like of the cable 300 may be avoided and durability of the cable 300 may be improved.

As illustrated in FIG. 10, the fixed-side confining member 500 may be opened symmetrically about a border line 506 that splits the cable guiding path 504 in the width direction. Thus, the degree of freedom of the movement of the cable 300 in the width direction is further improved.

Figure 11:
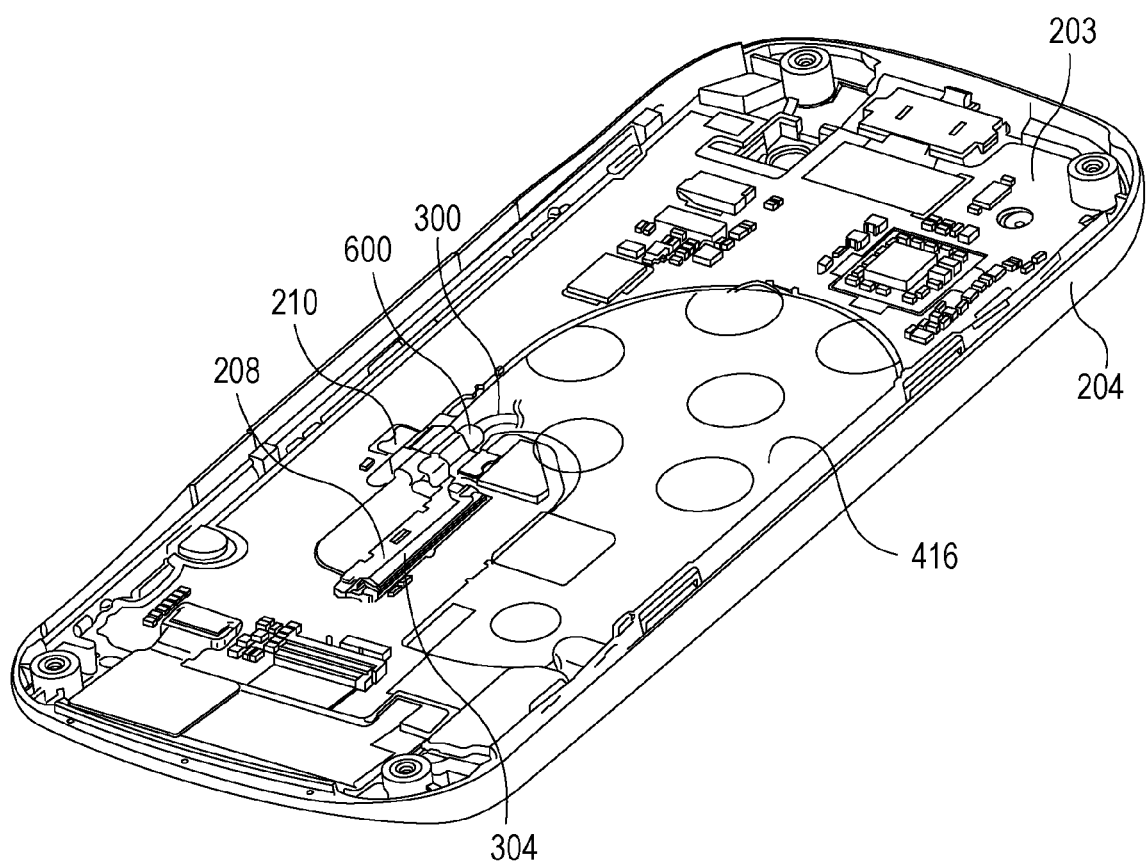
FIG. 11 is an internal perspective view of movable-side case of a vicinity of a movable-side confining member.
Figure 12:
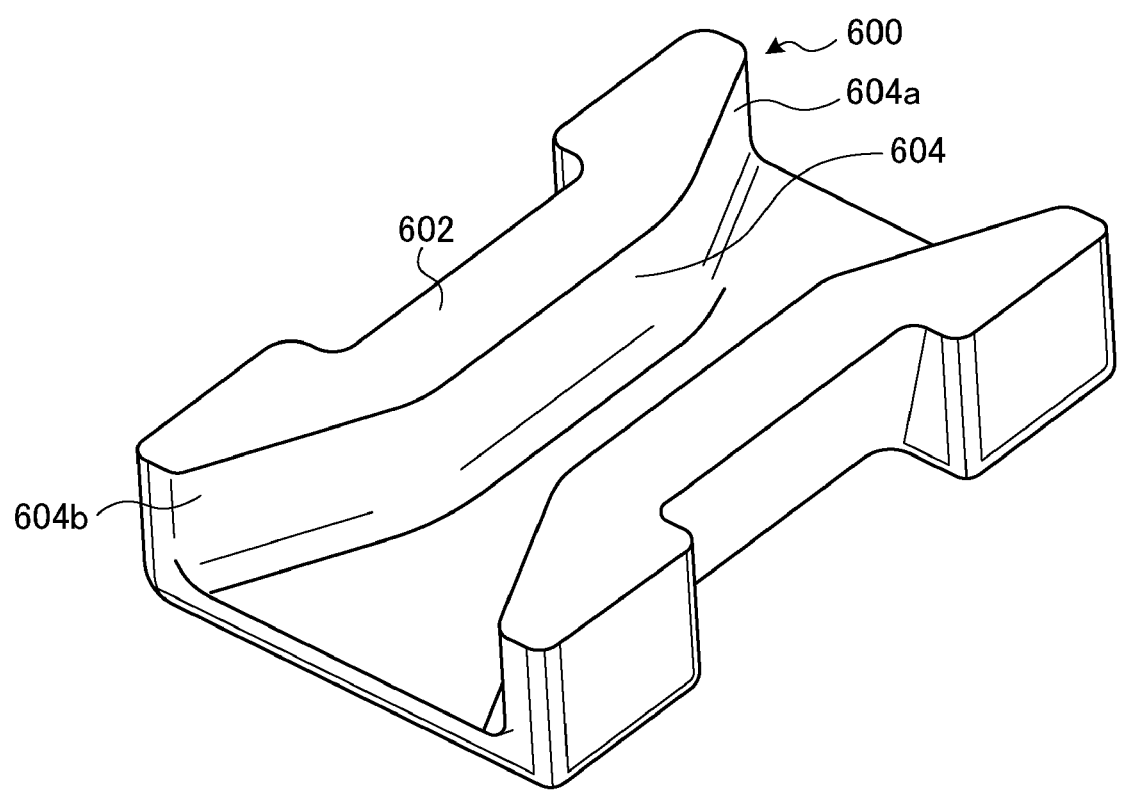
FIG. 12 is an enlarged top perspective view of the movable-side confining member.
Figure 13:
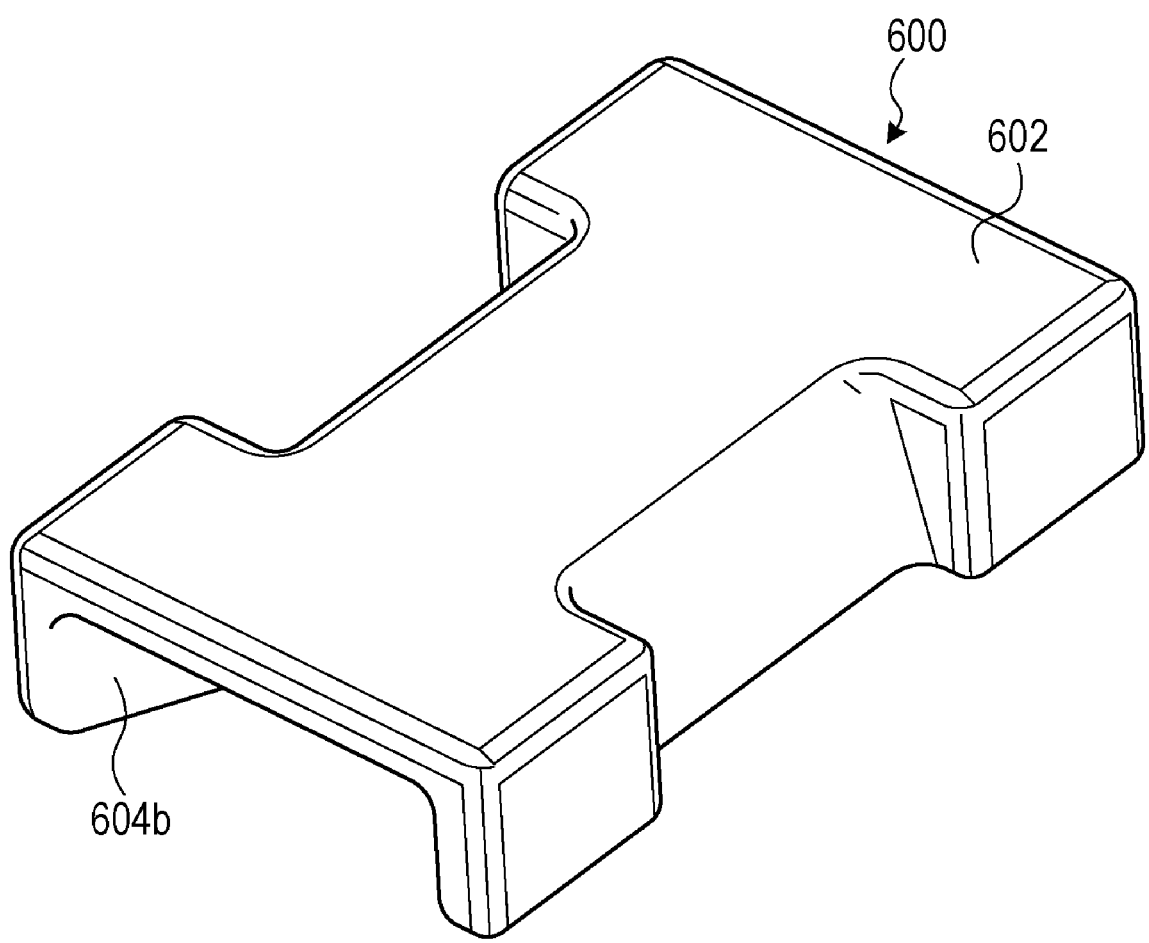
FIG. 13 is an enlarged bottom perspective view of the movable-side confining member.

Referring to FIGS. 11 and 12, the structure of the movable-side confining member 600, which is fixed to the movable-side substrate 203, will be described in detail. FIG. 11 is an internal perspective view of movable-side case 200 of a vicinity of the movable-side confining member 600. FIG. 12 is an enlarged top perspective view of the movable-side confining member 600. FIG. 13 is an enlarged bottom perspective view of the movable-side confining member 600. FIG. 11 illustrates a state in which the movable-side substrate 203 has been attached to the movable-side front case 204 of the movable-side case 200 illustrated in FIG. 5.

As illustrated in FIGS. 4, 5, and 11, the movable-side confining member 600 is fixed to the movable-side substrate 203 at a position near the connection adapter 208 with the clip 210. The movable-side confining member 600 confines movement of the cable 300, which is inserted through the through hole 212 in the movable-side case 200 toward the movable-side substrate 203, in the longitudinal direction.

To be specific, as illustrated in FIGS. 12 and 13, the movable-side confining member 600 includes a movable-side confining member body 602 and a cable guiding path 604 formed in the movable-side confining member body 602. The movable-side confining member body 602, which is made of an elastic material, is fixed to the movable-side substrate 203 with the clip 210. The clip 210 serves as a holding member. The cable guiding path 604 confines movement of the cable 300 in the longitudinal direction by pressing the inner peripheral surface of the cable guiding path 604 against the outer peripheral surface of the cable 300 that is inserted through the through hole 212 in the movable-side case 200 toward the movable-side substrate 203.

In the embodiment, the movable-side confining member 600 is attached to the movable-side substrate 203. The movable-side confining member 600 confines movement of the cable 300, which is inserted through the through hole 212 toward the movable-side substrate 203, in the longitudinal direction. Thus, if tension is applied to the cable 300 during assembling or when the movable-side case 200 is moved, application of an excessive load to the second end of the cable 300, the second end being connected to the connection adapter 208 of the movable-side substrate 203 through the connector 304, may be avoided. Therefore, troubles such as breakage of the cable 300 and disconnection of the connector 304 may be reduced if not prevented.

Movement of the cable 300 in the longitudinal direction is confined in the movable-side case 200, so that an inadvertent change in the length of the extra-length portion 306 of the cable 300 may be avoided. Thus, for example, the length of the extra-length portion 306 becoming excessively long and the extra-length portion 306 being caught on a portion of the cable-containing section 400 may be avoided.

Wider portions 604a and 604b are respectively formed at the entrance and the exit of the cable guiding path 604 so as to allow the cable 300 to move in the width direction. Thus, the cable 300 may move in the width direction when the movable-side case 200 is moved, whereby twisting or the like of the cable 300 may be avoided and durability of the cable 300 may be improved.

In the embodiment, the fixed-side substrate 103 and the movable-side substrate 203 are electrically connected to each other with the cable 300. The cable-containing section 400 in the movable-side case 200 makes the extra-length portion 306 of the cable 300 take a spiral shape, contains the extra-length portion 306, and allows movement of the extra-length portion 306 when the movable-side case 200 is moved. Thus, the cable-containing section 400 may contain the extra-length portion 306 having a substantial length, without requiring an additional space in the thickness direction of the case. When stress due to movement of the movable-side case 200 is applied to the cable 300, the cable-containing section 400 allows movement of the extra-length portion 306 in accordance with the stress, whereby the stress to the cable 300 may be dispersed. As a result, an electric wiring line connecting the two cases to each other may be compactly stowed, and breakage of the electric wiring may be reduced if not prevented.

The invention is not limited to the above-described embodiment. The invention may be applied to various embodiments within the spirit and scope of the invention described in the claims.

In the above-described embodiment, when the mobile phone 10 is in the closed state, the upright wall 404 confines the extra-length portion 306 of the cable 300 along the curved surface 404a, and thereby makes the extra-length portion 306 take a spiral shape. The extra-length portion 306 of the cable 300 is covered with a low friction protective coating. Therefore, the extra-length portion 306, which is confined by the upright wall 404, may slide along the upright wall 404 and jump over the upright wall 404. Thus, as illustrated in FIG. 14, a jumping-prevention member 700 may be attached to the upright wall 404 so as to reduce if not prevent jumping of the extra-length portion 306.

Figure 14:
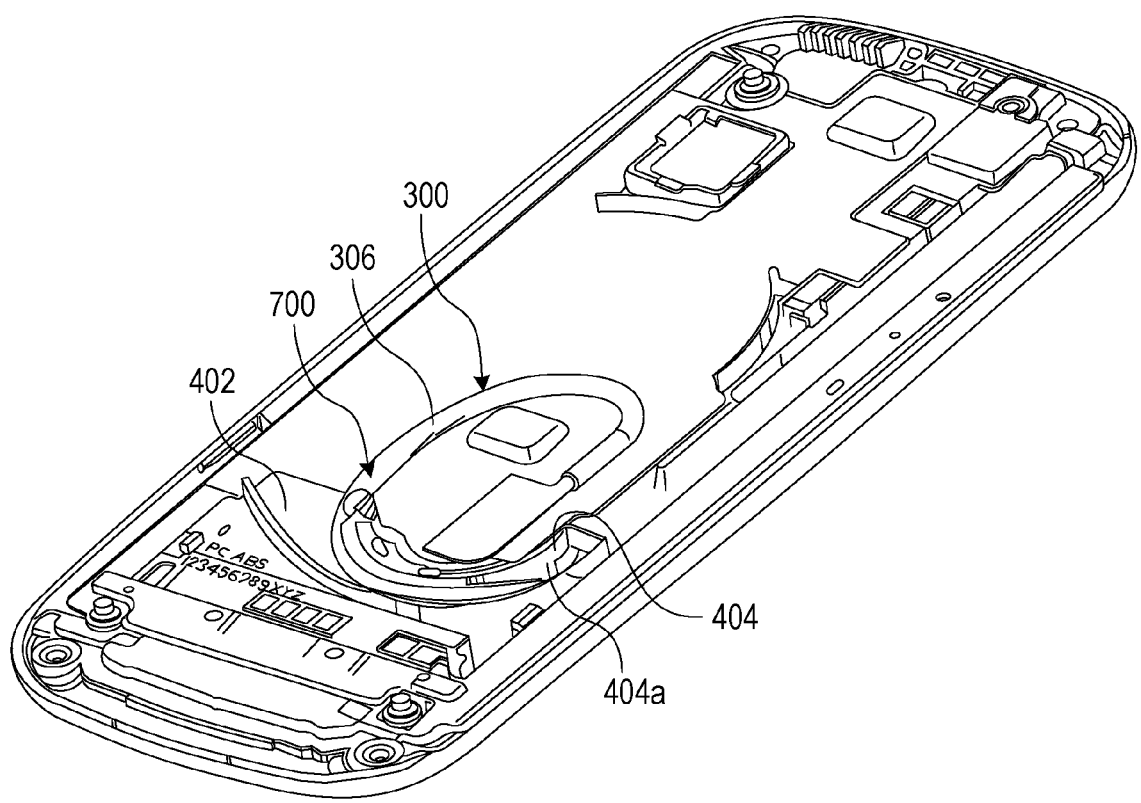
FIG. 14 is a perspective view illustrating a state in which a jumping-prevention member has been attached to an upright wall.
Figure 15:
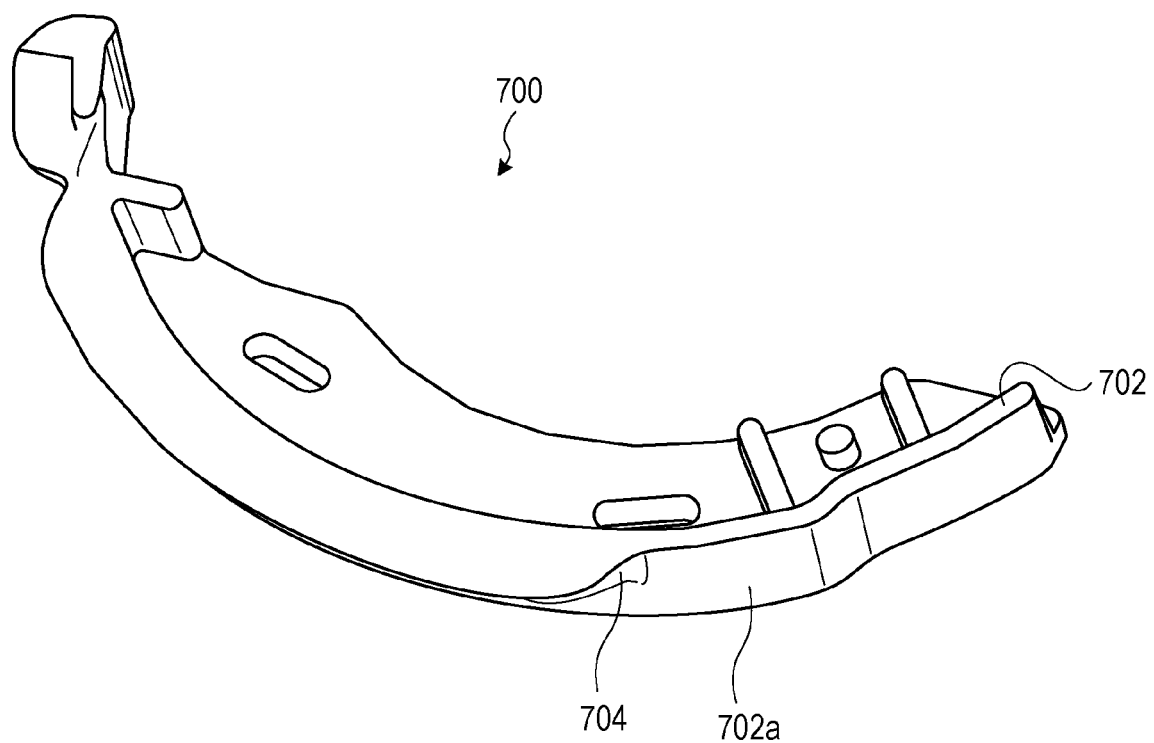
FIG. 15 is an enlarged perspective view of the jumping-prevention member.

FIG. 14 is a perspective view illustrating a state in which the jumping-prevention member 700 has been attached to an upright wall 404. FIG. 15 is an enlarged perspective view of the jumping-prevention member 700. As illustrated in FIGS. 14 and 15, the outline of the jumping-prevention member 700 has a crescent shape. The jumping-prevention member 700 includes a fitting wall 702 and a protrusion 704 integrally formed with the upper end of the fitting wall 702.

The fitting wall 702 may be fitted into and removed from the upright wall 404. The fitting wall 702 has a curved surface 702a having a curvature that is the same as that of the curved surface 404a of the upright wall 404. When the fitting wall 702 is fitted into the upright wall 404, the fitting wall 702, in cooperation with the upright wall 404, confines the extra-length portion 306 of the cable 300 along the curved surface 702a, and thereby makes the extra-length portion 306 take a spiral shape. The protrusion 704 protrudes from the upper end of the fitting wall 702 in such a manner that the protrusion 704 covers the cable 300 placed on the bottom wall 402 from upward when the jumping-prevention member 700 is attached to the upright wall 404.

The jumping-prevention member 700 reduces if not prevents jumping of the extra-length portion 306 by making the extra-length portion 306, which slides along the upright wall 404, contact the protrusion 704.

In the above-described embodiment, the information terminal device is applied to a mobile phone. However, the invention is not limited thereto. For example, the information terminal device of the embodiment may be applied to small information processing devices such as personal digital assistants (PDAs), small music players, portable TV sets, portable game machines, and other information terminal devices.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. An information terminal device comprising:
  a first case;
  a second case electrically connected to the first case with a cable, the second case being movable relative to the first case; and
  a cable-containing section that allows movement of an extra-length portion of the cable, the extra-length portion being disposed so as to have a spiral shape, the movement of the extra-length portion being caused by movement of one of the first case and the second case,
  wherein the cable-containing section is disposed in one of the first case and the second case;
  the cable-containing section further comprising:
  a bottom wall on which the cable is placed, the cable being inserted through a first through hole in a second case surface toward a second case substrate disposed in the second case, the second case surface facing the first case, an upright wall that confines the extra-length portion of the cable placed on the bottom wall and thereby makes the extra-length portion take a spiral shape, and a top wall that confines the cable between the top wall and the bottom wall with the upright wall therebetween.

2. The information terminal device according to claim 1, wherein the upright wall includes a curved surface having a specific curvature, and the extra-length portion is disposed along the curved surface.

3. The information terminal device according to claim 1, wherein the upright wall includes a curved surface having a plurality of curvatures that are different from each other, and the extra-length portion is disposed along the curved surface.

4. The information terminal device according to claim 1, wherein the bottom wall includes a guiding section having an inclined surface, and the guiding section guides the cable through the first through hole toward the second case substrate.

5. The information terminal device according to claim 1, wherein a low friction protective sheet is attached to each of the bottom wall and the top wall.

6. The information terminal device according to claim 1, wherein the second case is attached to the second case substrate, and the second case includes a second confining member that confines movement of the cable inserted through the first through hole toward the substrate disposed in the second case, the movement being in the longitudinal direction.

7. The information terminal device according to claim 6, the second confining member further comprising:

a second confining body made of an elastic material and attached to the second case substrate, and a cable guiding path formed in the second confining body, the cable guiding path guiding the cable inserted through the first through hole toward the second case substrate, the cable guiding path confining movement of the cable in the longitudinal direction by pressing an inner wall surface of the cable guiding path against an outer peripheral surface of the cable.

8. The information terminal device according to claim 7, wherein a wider portion is formed at each of an entrance and an exit of the cable guiding path, the wider portions allowing movement of the cable in a width direction.

9. The information terminal device according to claim 1, wherein the extra-length portion of the cable is covered with a low friction protective coating.

10. The information terminal device according to claim 1, the first case comprising:

a second through hole formed in a first case surface, the first case surface facing the second case, and a first confining member attached to the second through hole, the first confining member guiding the cable extending though the first through hole in the second case toward a first case substrate disposed in the first case, the first confining member confining movement of the guided cable in a longitudinal direction.

11. The information terminal device according to claim 10, the first confining member further comprising:

a first confining body made of an elastic material and fitted into the second through hole, and a cable guiding path formed in the first confining body, the cable guiding path guiding the cable extending through the first through hole toward the first case substrate, the cable guiding path confining movement of the guided cable in the longitudinal direction by pressing an inner wall surface of the cable guiding path against an outer peripheral surface of the cable.

12. The information terminal device according to claim 11, wherein a wider portion is formed at each of an entrance and an exit of the cable guiding path, the wider portions allowing movement of the cable in a width direction.

* * * * *